US008237426B2

(12) United States Patent
Chen et al.

(10) Patent No.: US 8,237,426 B2
(45) Date of Patent: Aug. 7, 2012

(54) FLUX LINKAGE COMPENSATOR FOR UNINTERRUPTIBLE POWER SUPPLY

(75) Inventors: Yu-Hsing Chen, Hsinchu (TW); Po-Tai Cheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 526 days.

(21) Appl. No.: 12/571,845

(22) Filed: Oct. 1, 2009

(65) Prior Publication Data

US 2011/0080157 A1 Apr. 7, 2011

(51) Int. Cl.
*H01F 27/42* (2006.01)
*H02H 7/122* (2006.01)

(52) U.S. Cl. .................................... 323/356; 363/56.01

(58) Field of Classification Search .................. 323/356, 323/357, 908; 363/15, 16, 56.01, 56.09, 363/56.1

See application file for complete search history.

(56) References Cited

U.S. PATENT DOCUMENTS

| | | | | |
|---|---|---|---|---|
| 4,096,363 | A * | 6/1978 | Earp | 323/357 |
| 4,607,142 | A * | 8/1986 | Martin | 379/406.04 |
| 5,047,911 | A * | 9/1991 | Sperzel et al. | 363/56.01 |
| 6,479,976 | B1 * | 11/2002 | Edel | 323/357 |

OTHER PUBLICATIONS

Ban et al., "Improved Motor Starting Capability of Three Phase UPS Inverters," 11th International Conference on Harmonics and Quality of Power, 2004, pp. 678-683.

Zaltsman, "Inrush Current Control for Equipment Powered BU UPSs," INTELEC '89 Conference Proceedings, 1989, pp. 19.4/1-19. 4/7.

Chen et al., "An Inrush Current Mitigation Technique for Line-Interactive Uninterruptable Power Supply Systems," Industry Applications Society Annual Meeting, Oct 5-9, 2008, pp. 1-8.

Chen et al., "Flux estimation technique for inrush current mitagation of line interactive UPS systems," presented at IEEE Energy Conversion Congress and Exposition, Sep. 20-24, 2009.

* cited by examiner

*Primary Examiner* — Matthew Nguyen

(74) *Attorney, Agent, or Firm* — Muncy, Geissler, Olds & Lowe, PLLC

(57) ABSTRACT

The present invention discloses a flux linkage compensator, which applies to an UPS system and comprises a load transformer flux linkage observer, a compensation voltage command generator, and a flux linkage command generator. The load transformer flux linkage observer generates a load transformer flux linkage signal. The flux linkage command generator generates a flux linkage command signal. The difference between the load transformer flux linkage signal and the flux linkage command signal forms a flux linkage deviation signal. The compensation voltage command generator generates a voltage compensation signal to make the flux linkage deviation signal approach zero. Thereby, the flux linkage compensator can compensate for the flux linkage deviation occurring in starting the UPS system. Thus, the present invention can perform voltage compensation fast and reliably and inhibit the inrush current effectively.

6 Claims, 8 Drawing Sheets

FLUX LINKAGE COMPENSATOR FOR UNINTERRUPTIBLE POWER SUPPLY

FIELD OF THE INVENTION

The present invention relates to a flux linkage compensator for an uninterruptible power supply, particularly to a flux linkage compensator used to inhibit the inrush current occurring in an uninterruptible power supply when power shifts.

BACKGROUND OF THE INVENTION

Reliable power supply and power quality are always the hot topics in industry. Unpredictable voltage drop or power shutdown usually interrupts the operating process or even damages equipment. Thus, many sensitive loads rely on UPS (Uninterruptible Power Supply) systems to maintain the stability of power supply lest the operating equipment be interrupted by a power failure suddenly.

Refer to FIG. 1 for a conventional line-interactive UPS system. Normally, the voltage at the utility power end 2 is transferred to a load 5 via a primary thyristor 3 and a load transformer 4. When detecting the voltage at the utility power end 2 abnormally (an instantaneous voltage drop or a sudden power interruption), the UPS system 1 is started up immediately. The power output by the UPS system 1 is sent to the load 5 via a secondary thyristor 6 lest the load 5 be shut down.

When the voltage of the utility power end 2 is interfered, the UPS system 1 has to shift the power of the load 5 within 1-5 ms lest any type of power interruption should occur. Within the 1-5 ms duration of load shifting, the distorted voltage waveform still applies to the load transformer 4 and causes the deviation of the flux linkage of the load transformer 4. When the UPS system 1 has completely taken over the voltage for the load and restored to the rated value, the flux linkage of the load transformer 4 may have exceeded the regulated operation range, which will cause a serious inrush current. Normally, the inrush current caused by magnetic saturation may reach as high as 2-6 times of the rated load current and last for several cycles of the utility power. The inrush current may cause the drop of voltage in the load circuit or even trigger the overcurrent protection mechanism of the UPS system. Once the overcurrent protection mechanism is triggered, the UPS system stops operating.

Many methods had been proposed to inhibit the inrush current caused by magnetic saturation of a transformer. Among them, directly controlling the output voltage of the UPS system is regarded as a simple and effective method. For example, in pp. 678-683 proceedings of 11th International Conference on Harmonics and Quality of Power, 2004, L. Ban and T. H. Ortmeyer proposed a paper "Improved Motor Starting Capability of Three Phase UPS Inverters", wherein the output voltage of a UPS system is decreased by detecting value of the inrush current. In another method, the inrush current is inhibited via controlling the phase angle of the output voltage of the UPS system, wherein the voltage is output to the load transformer when the voltage waveform is at a phase angle of 90 degrees. For example, V. Zaltsman proposed a paper "Inrush current control for equipment powered by UPSs" in pp. 19.4/1-19.4/7 INTELEC'89 Conference Proceedings, 1989. However, in the abovementioned methods, the UPS system may be unlikely to instantly output the rated voltage required by the load, which exposes the load to a distorted voltage waveform for a longer duration, increases the probability of shutdown, or even damages the load. Besides, the abovementioned methods are unlikely to perform a fast load shifting to provide a stable power for the load when power fails or voltage drops dramatically.

SUMMARY OF THE INVENTION

One objective of the present invention is to provide a flux linkage compensator for an uninterruptible power supply (UPS) system, which compensates for the flux linkage deviation to inhibit the inrush current when the UPS system is started up, whereby is realized a fast and reliable voltage compensation and solved the conventional problems.

To achieve the abovementioned objective, the present invention proposes a flux linkage compensator for an UPS system, which comprises a load transformer flux linkage observer, a compensation voltage command generator, and a flux linkage command generator. The load transformer flux linkage observer generates a load transformer flux linkage signal. The flux linkage command generator generates a flux linkage command signal. The difference of the load transformer flux linkage signal and the flux linkage command signal forms a flux linkage deviation signal. The compensation voltage command generator receives the flux linkage deviation signal and generates a voltage compensation signal to make the flux linkage deviation signal approach zero.

Via the present invention, an UPS system can provide high voltage quality and inhibit inrush current when the load powers are shifted.

DETAILED DESCRIPTION OF THE PREFERRED EMBODIMENTS

Below, the technical contents and embodiments of the present invention are described in detail in cooperation with the drawings.

Figure 1:
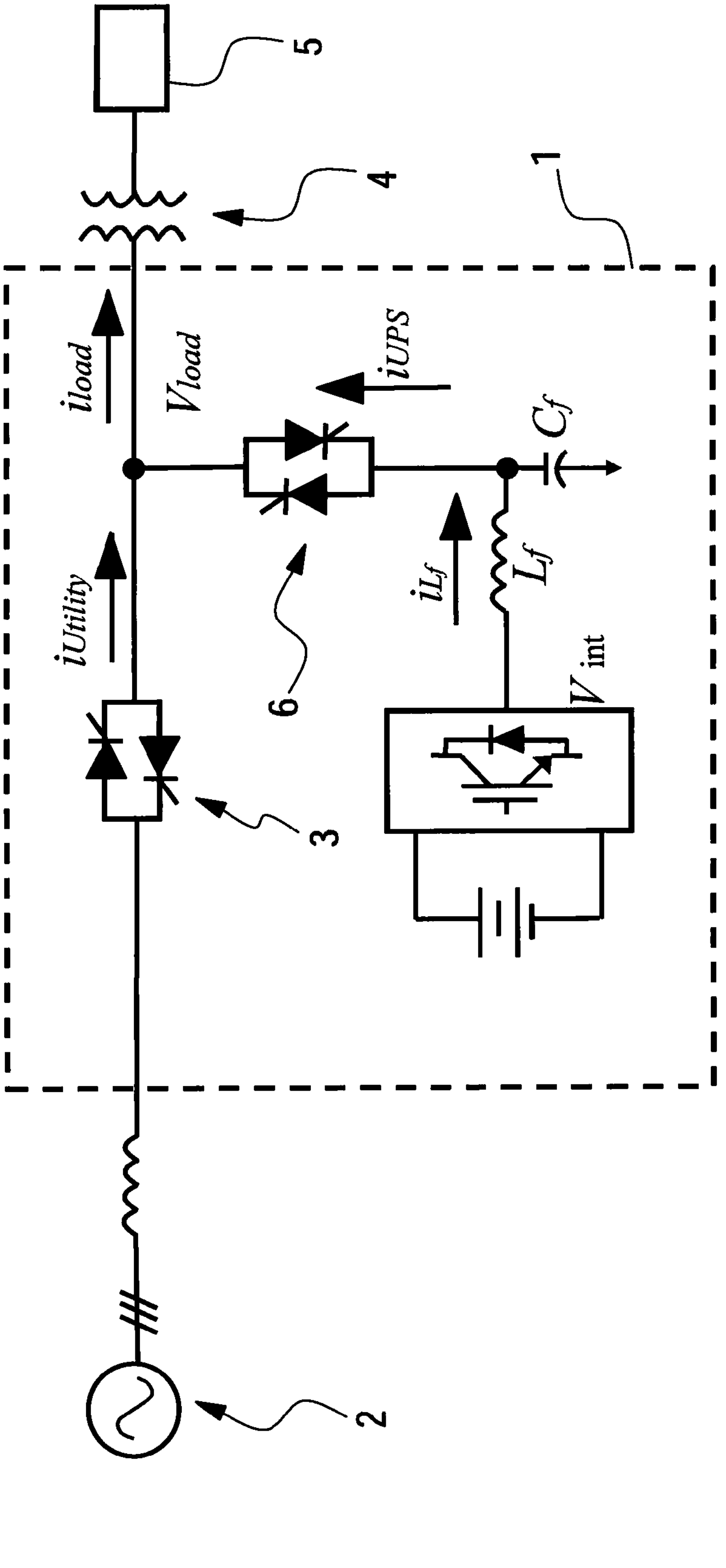
Fig.1 PRIOR ART
FIG. 1 is a diagram schematically showing a conventional line-interactive UPS system.
Figure 2:
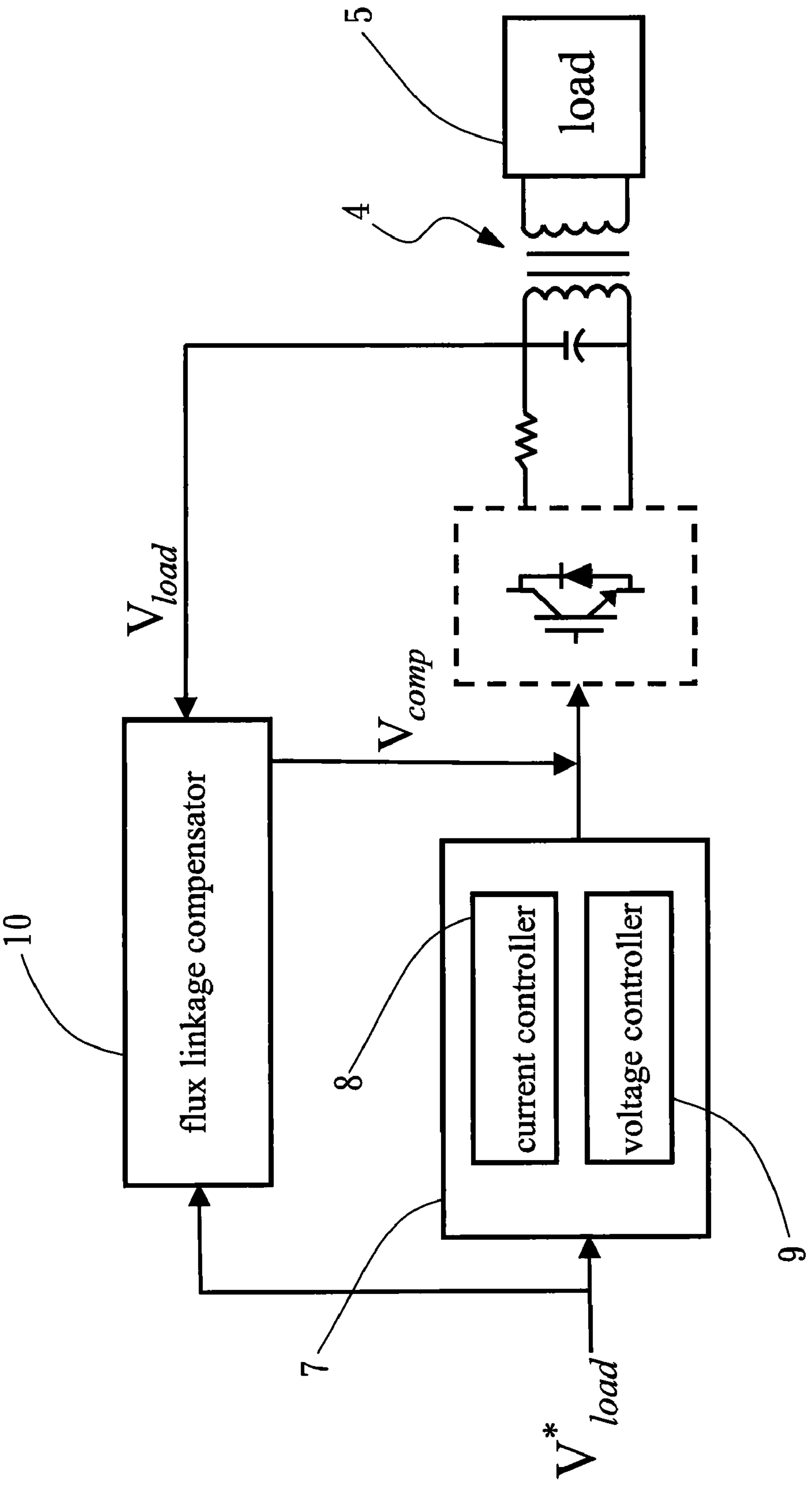
FIG. 2 is a block diagram schematically showing the architecture where a flux linkage compensator is applied to an uninterruptible power supply system according to the present invention.

The present invention proposes a flux linkage compensator for an uninterruptible power supply (UPS) system, which is referred to as the flux linkage compensator thereinafter. Refer to FIG. 2 a block diagram schematically showing the architecture where a flux linkage compensator 10 is applied to an UPS system according to the present invention. The UPS system comprises a controller 7 detecting the electric signal of the utility power and controlling output. The controller 7 includes a current controller 8 and a voltage controller 9. The current controller 8 and the voltage controller 9 control their output according to the voltage required by a load 5. When detecting a voltage abnormality of the utility power, the controller 7 controls and outputs an appropriate current and voltage signal and implements a stable and reliable power supply capability of the UPS system. The flux linkage compensator 10 of the present invention detects the voltage of the load 5 to estimate the variation of the flux linkage of the load transformer 4. The flux linkage compensator 10 cooperates with the flux linkage command to form a feedback control loop of the flux linkage state. The voltage signal, which compensates for the flux linkage deviation to inhibit the inrush current, is worked out according to the difference between the estimated value of the flux linkage of the load transformer and the flux linkage command (the details will be described later). It should be noted: FIG. 2 does not show the conventional components used in the flux linkage compensator 10 lest the essentials of the present invention are defocused. Further, the drawings and embodiments in the specification are only to exemplify the present invention but not to limit the scope of the present invention.

Figure 3:
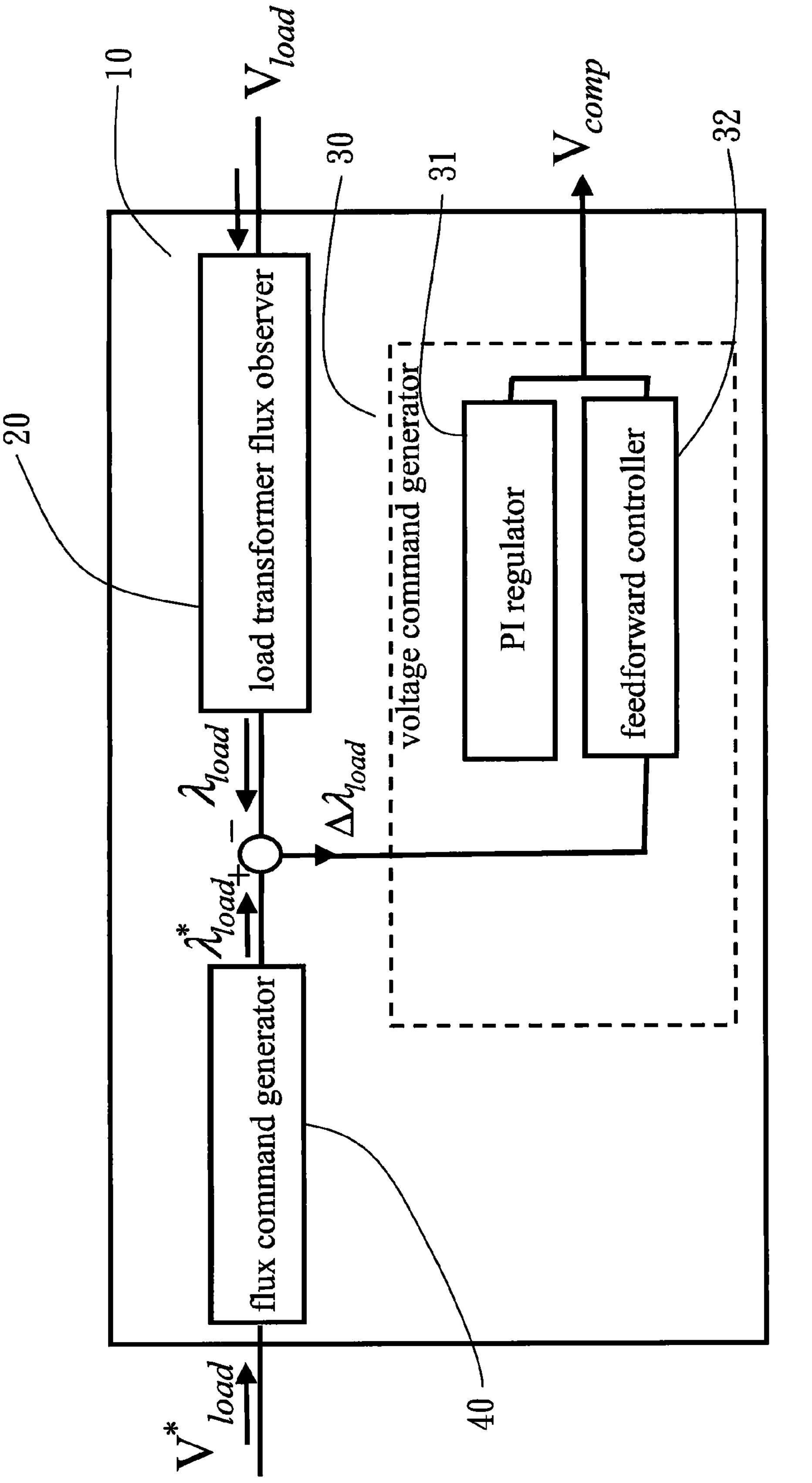
FIG. 3 is a block diagram schematically showing the architecture of a flux linkage compensator according to the present invention.

Refer to FIG. 3 a block diagram schematically showing the architecture of a flux linkage compensator according to the present invention. The flux linkage compensator 10 comprises a load transformer flux linkage observer 20, a compensation voltage command generator 30, and a flux linkage command generator 40. The load transformer flux linkage observer 20 generates the estimated value of the load transformer flux linkage $\lambda_{load}$ according to electric signal of the load, such as the load voltage $V_{load}$.

According to the Faraday's law, the flux linkage can be expressed by Equation (1):

$$\lambda(t)=\int V(t)dt \tag{1}$$

Thus, the flux linkage compensator 10 integrates the load voltage $V_{load}$ to calculate the load transformer flux linkage $\lambda_{load}$ functioning as a feedback control signal. Similarly, the flux linkage command generator 40 integrates a load voltage command $V^*_{load}$ to obtain a flux linkage command $\lambda^*_{load}$. The difference between the load transformer flux linkage $\lambda_{load}$ and the flux linkage command $\lambda^*_{load}$ forms a flux linkage deviation $\Delta\lambda_{load}$. According to the signal of the flux linkage deviation $\Delta\lambda_{load}$, the compensation voltage command generator 30 outputs a voltage compensation command $V_{comp}$ to make the flux linkage deviation $\Delta\lambda_{load}$, which is caused by circuit malfunction, approach zero and inhibit the inrush current.

The compensation voltage command generator 30 may have a PI (Proportional Integral) regulator 31 converting the flux linkage deviation $\Delta\lambda_{load}$ into the corresponding voltage compensation command $V_{comp}$ to make the flux linkage deviation $\Delta\lambda_{load}$ approach zero. Preferably, the compensation voltage command generator 30 further has a feedforward controller 32 used to enhance the dynamic response of the flux linkage compensator.

Figure 4:
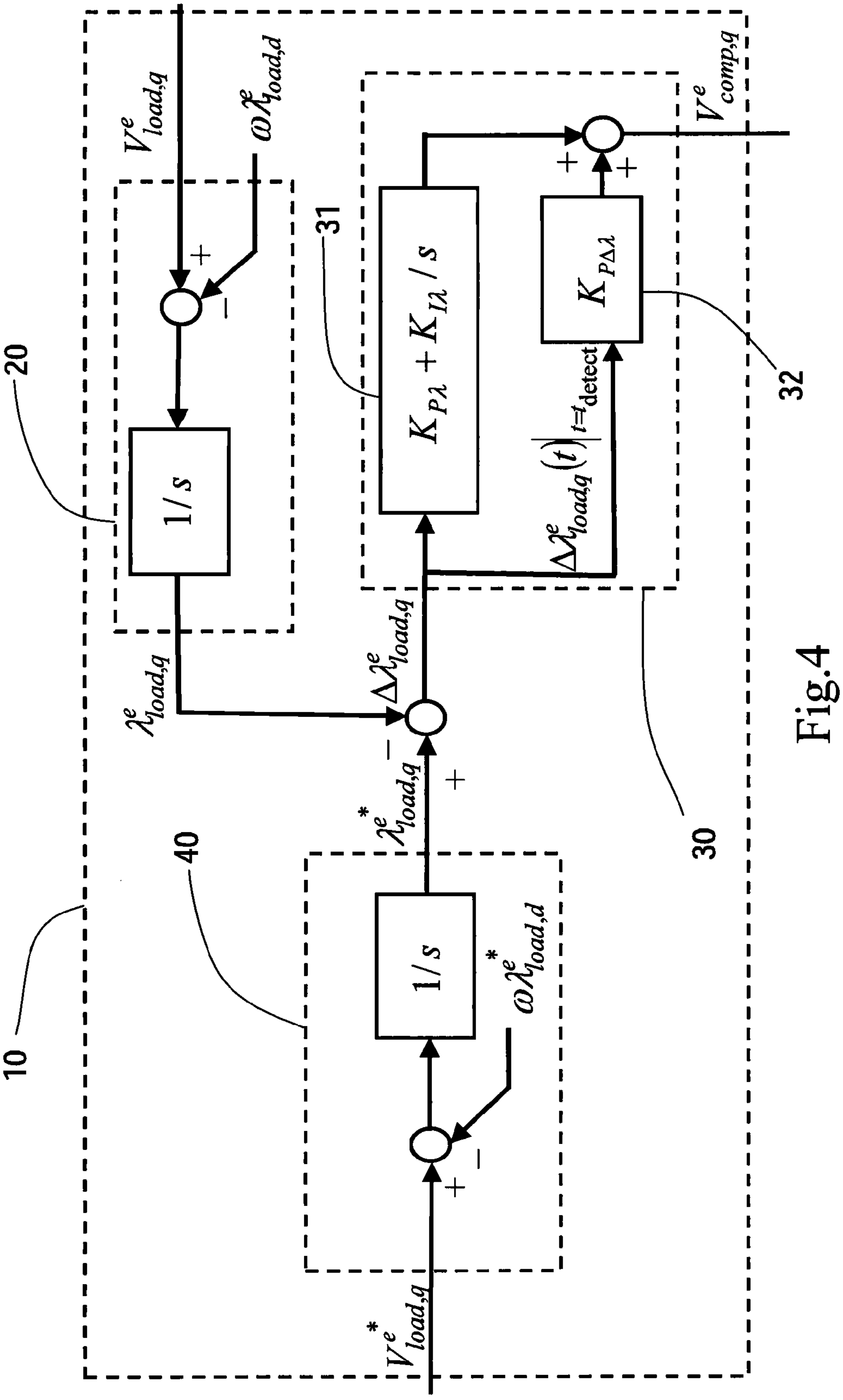
FIG. 4 is a block diagram schematically showing the architecture of a flux linkage observer according to the present invention.

Refer to FIG. 4 a block diagram schematically showing the architecture of a flux linkage observer according to the present invention. In the embodiment, the controller is based on a synchronous reference frame (SRF, denoted by a superscript of "e"), but the present invention does not limit the controller to SRF. The three-phase alternating electric signals (the voltage and current) are transformed to a static reference frame (not shown in the drawing) with a coordinate axis transformation and then converted into two-phase DC signals via an SRF transformation synchronous with the commercial frequency (60 Hz, ω=377 rad/s). Thereinafter, the superscripts "e" and "s" respectively denote the SRF system and the static reference frame system. The subscripts "q" and "d" respectively denote the components in the q coordinate and the d coordinate in the abovementioned reference frames. The superscript "*" denotes a command.

In the embodiment, the load transformer flux linkage observer 20 integrates a load voltage (denoted by 1/s in FIG. 4) to generate a corresponding load transformer flux linkage $\lambda^e_{load,q}$. Besides, a voltage command $V_{load,q}{}^{e*}$ is integrated to generate a flux linkage command $\lambda_{load,q}{}^{e*}$. The difference between the load transformer flux linkage $\lambda_{load,q}{}^{e}$ and the flux linkage command $\lambda^e_{load,q}{}^*$ forms the flux linkage deviation $\Delta\lambda^e_{load,q}$ signal. FIG. 4 also shows a PI regulator 31 ($K_{P\lambda}$+$K_{I\lambda}$/s). As the PI regulator 31 is a conventional technology, it will not be described herein. Besides, the present invention does not limit the PI regulator 31 to be shown in FIG. 4. In the embodiment, the controller of the UPS system is based on the SRF of the commercial frequency. Therefore, under the condition of three-phase balance, all the control signals are in the DC (Direct Current) mode. Via the PI regulator 31, the flux linkage deviation $\Delta\lambda^e_{load,q}$ based on SRF can rapidly converge to zero after the UPS system is started.

In addition to the PI regulator 31 controlling the flux linkage deviation $\Delta\lambda^e_{load,q}$, the compensation voltage command generator 30 further has a feedforward controller 32, which can use a proportional control gain (denoted by $K_{P\Delta\lambda}$ in FIG. 4) to fast compensate for the flux linkage deviation $\Delta\lambda^e_{load,q}$ caused by circuit malfunction. The flux linkage deviation $\Delta\lambda^e_{load,q}$ may be regarded as the volt-second area of the voltage waveform lost in an instantaneous voltage drop (the area K shown in FIG. 5A). The proportional control gain $K_{P\Delta\lambda}$ can work out the compensation voltage corresponding to the lost volt-second area of the voltage waveform according to the flux linkage deviation, whereby the flux linkage deviation can be fast compensated. The compensation voltage, which are respectively worked out by the PI regulator 31 and the feedforward controller 32, are accumulated to generate a compensation voltage command $V^e_{comp,q}$. The compensation voltage command $V^e_{comp,q}$ combines with the output voltage of the UPS system to compensate for the flux linkage deviation and inhibit the inrush current.

The abovementioned proportional control gain $K_{P\Delta\lambda}$ is defined by Equation (2):

$$K_{P\Delta\lambda}=\begin{cases}\dfrac{1}{\Delta T_{comp}} & \text{for } t_{detect}\le t\le(t_{detect}+\Delta T_{comp})\\ 0 & \text{for } t\ge(t_{detect}+\Delta T_{comp})\end{cases} \tag{2}$$

Figure 5A:
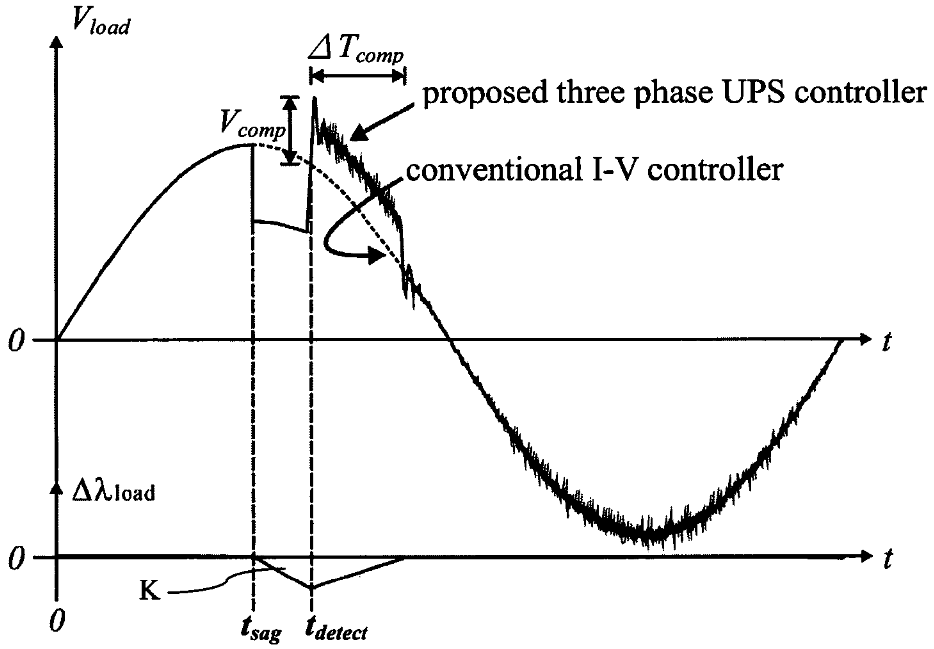
FIG. 5A is a diagram schematically showing the compensation of the flux linkage deviation during the shifting of the loads according to the present invention.

Refer to FIG. 5A a diagram schematically showing the compensation of the flux linkage deviation during the shifting of the loads according to the present invention. FIG. 5A shows the relationship of the load voltage waveform and the corresponding flux linkage deviation during the load shifting, wherein $\Delta T_{comp}$ is the preset time required to compensate for the flux linkage deviation, $t_{sag}$ is the time point at which instantaneous voltage drop occurs, $t_{detect}$ is the time point at which circuit malfunction is detected, and $V_{comp}$ is the voltage compensation in the present invention. When an instantaneous voltage drop occurs at a time point $t=t_{sag}$ in the utility power end, the flux linkage deviation $\Delta\lambda_{load}$ begins to gradually increase. The UPS system detects the instantaneous voltage drop at a time point $t=t_{detect}$ and immediately injects a compensating voltage $V_{load}$ containing the voltage compensation $V_{comp}$. The voltage compensation $V_{comp}$ can make the flux linkage deviation $\Delta\lambda_{load}$ gradually approach zero. Thereby, the flux linkage deviation $\Delta\lambda_{load}$ of an the transformer is rapidly compensated, and the inrush current is effectively inhibited.

Figure 5B:
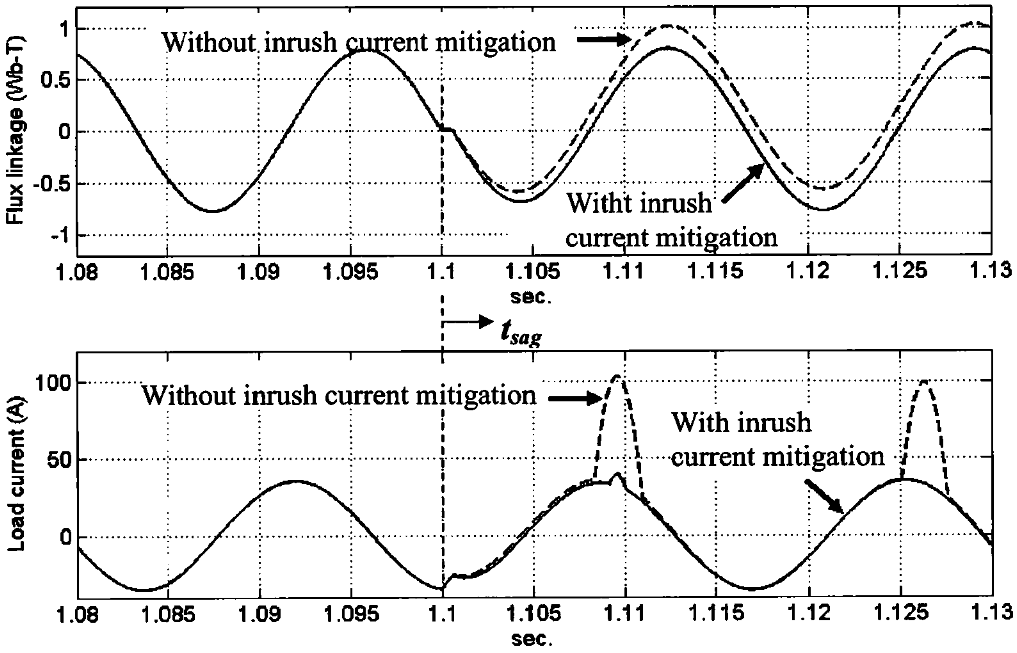
FIG. 5B is a diagram schematically showing the simulation of inhibiting inrush current according to the present invention.

Refer to FIG. 5B a diagram schematically showing the simulation of the present invention. Suppose that a circuit malfunction occurs at 1.1 second of the time axis. Suppose that the UPS system does not adopt the present invention to inhibit inrush current. When the UPS system is started, the inrush current caused by circuit malfunction will reach as high as 2.9 times of the stable-state current. If the UPS system adopts the flux linkage compensator 10 of the present invention, the inrush current will be completely inhibited.

Figure 6:
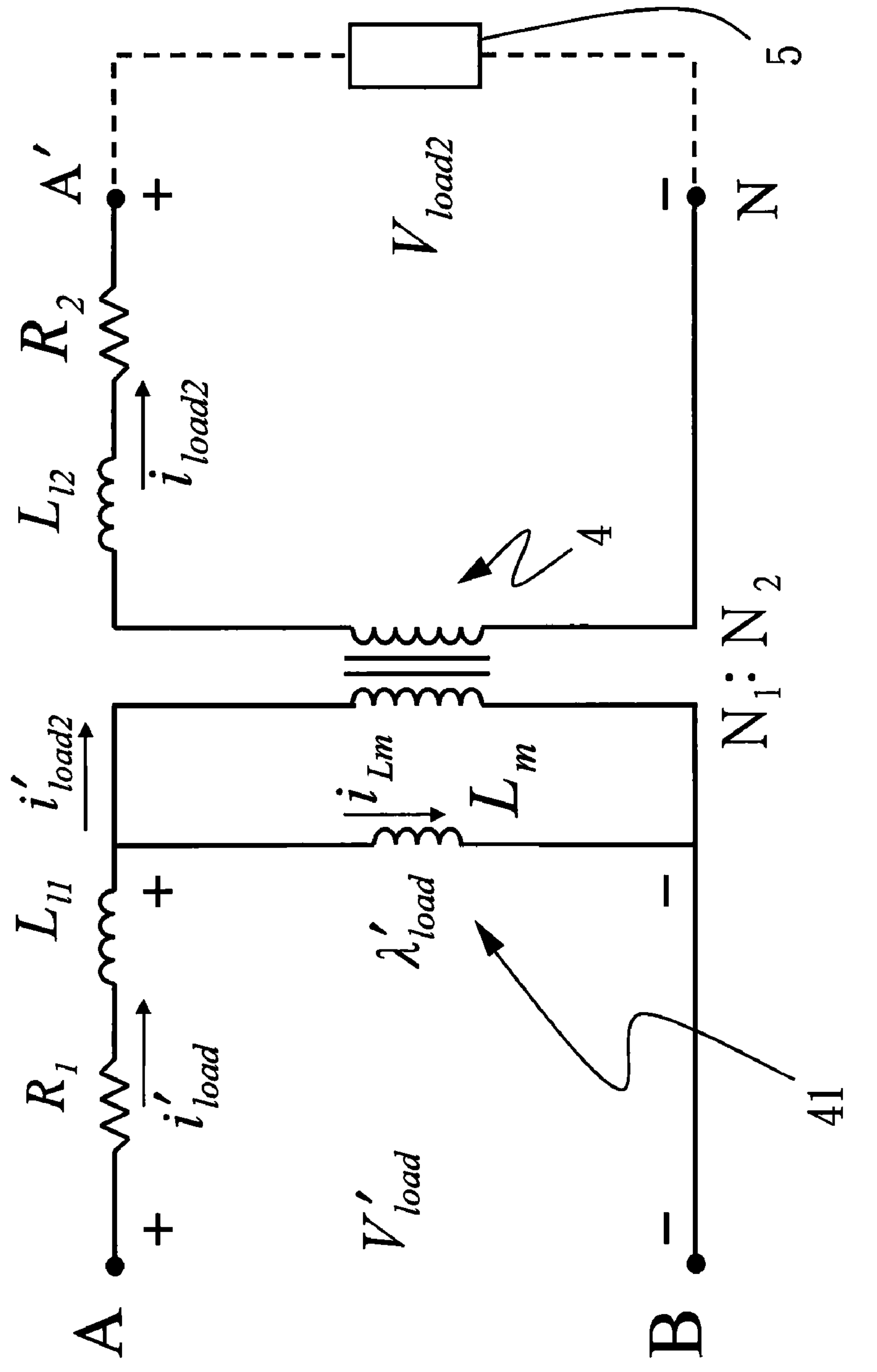
FIG. 6 is a diagram schematically showing a single-phase equivalent circuit of a transformer.

Hereinbefore, the load transformer flux linkage observer 20 works out the integrated value of the load voltage to be the estimated value of the load transformer flux linkage. In addition to the abovementioned method, an open-loop flux linkage estimator 21 or a close-loop flux linkage observer 22 may also be used to estimate the flux linkage of the load transformer more accurately. Refer to FIG. 6 a diagram schematically showing a single-phase equivalent circuit of a transformer. In one embodiment, estimating the equivalent flux linkage across Points A and B, i.e. the sum of the flux linkage passing an inductance $L_{l1}$ and the exciting inductance 41($L_m$). Compared with the flux linkage passing the exciting inductance 41, the flux linkage passing the inductance $L_{l1}$ is so small that it can be neglected. Therefore, estimating the equivalent flux linkage across Points A and B is almost equal to estimating the flux linkage $\lambda'_{load}$ passing the exciting inductance 41. In order to increase the accuracy of estimating the load transformer flux linkage, the open-loop flux linkage estimator 21 and the close-loop flux linkage observer 22 directly estimate the flux linkage $\lambda'_{load}$ passing the exciting inductance 41.

Refer to FIG. 6 again. In the static reference frame, the mathematic transformation model of the load transformer 4 can be expressed by Equations (3) and (4):

$$\begin{bmatrix} V^{s'}_{load,q} \\ V^{s'}_{load,d} \end{bmatrix} = \left(R_1 + L_{l1}\frac{d}{dt}\right)\begin{bmatrix} i^{s'}_{load,q} \\ i^{s'}_{load,d} \end{bmatrix} + \frac{d}{dt}\begin{bmatrix} \lambda^{s'}_{load,q} \\ \lambda^{s'}_{load,d} \end{bmatrix} \tag{3}$$

$$\begin{bmatrix} i^{s'}_{load,q} \\ i^{s'}_{load,d} \end{bmatrix} = \frac{1}{L_m}\begin{bmatrix} \lambda^{s'}_{load,q} \\ \lambda^{s'}_{load,d} \end{bmatrix} - \frac{1}{R'_2 + L'_{l2}s}\left(\begin{bmatrix} V^{s'}_{load2,q} \\ V^{s'}_{load2,d} \end{bmatrix} - \frac{d}{dt}\begin{bmatrix} \lambda^{s'}_{load,q} \\ \lambda^{s'}_{load,d} \end{bmatrix}\right) \tag{4}$$

wherein $V_{load2}'=(N_1/N_2)V_{load2}$ $R_2'=(N_1/N_2)^2R_2$ $L_{l2}'=(N_1/N_2)^2L_{l2}$ $L_1=L_{l1}+L_m$ $L_2'=L_{l2}'+L_m$ Equation (3) can be transformed via the SRF to obtain Equation (5):

$$\frac{d}{dt}\begin{bmatrix} \hat{\lambda}^{e'}_{load,q} \\ \hat{\lambda}^{e'}_{load,d} \end{bmatrix} = \begin{bmatrix} V^{e'}_{load,q} \\ V^{e'}_{load,d} \end{bmatrix} - \hat{R}_1\begin{bmatrix} i^{e'}_{load,q} \\ i^{e'}_{load,d} \end{bmatrix} - \tag{5}$$

Figure 7A:
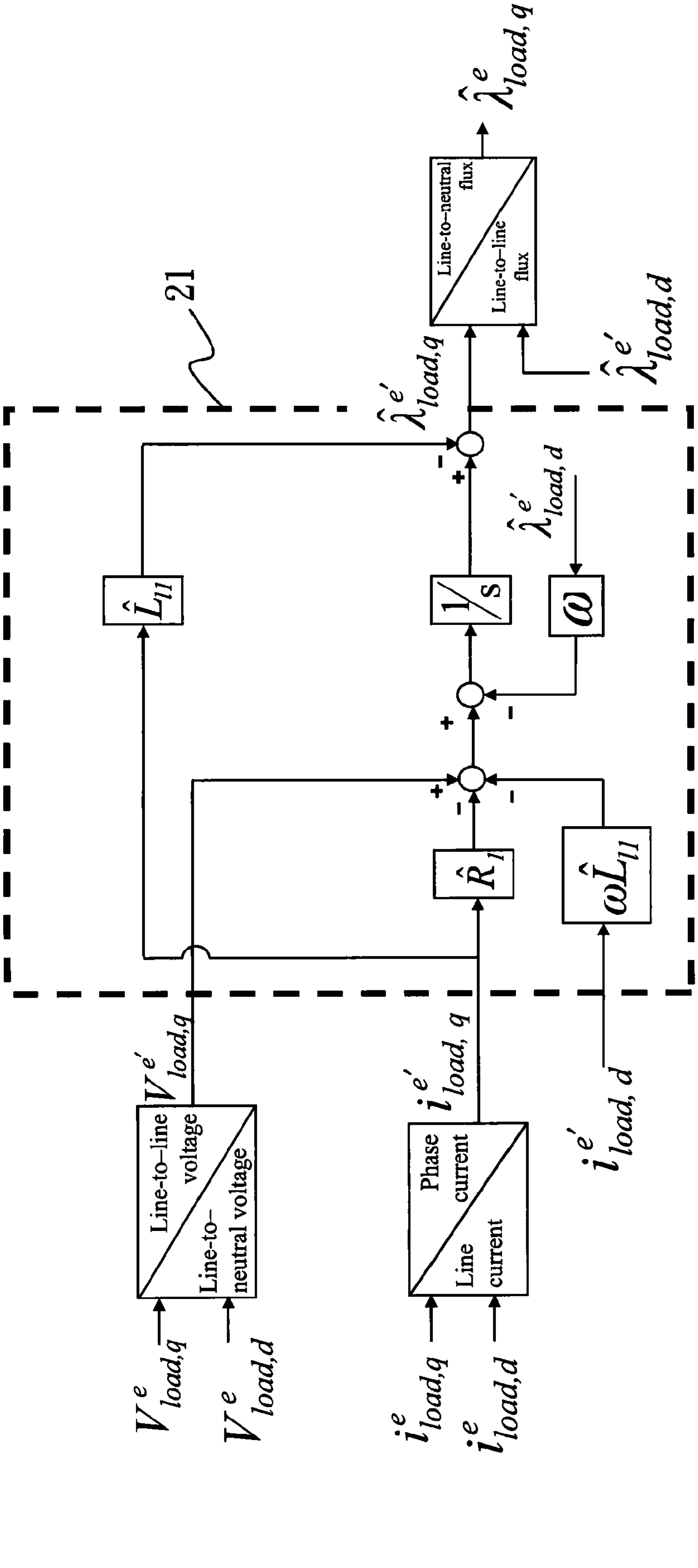
FIG. 7A is a block diagram schematically showing an embodiment of the open-loop flux linkage estimator according to the present invention.

-continued $$\hat{L}_{l1}\begin{bmatrix} 0 & \omega \\ -\omega & 0 \end{bmatrix}\begin{bmatrix} i^{e'}_{load,q} \\ i^{e'}_{load,d} \end{bmatrix} - \begin{bmatrix} 0 & \omega \\ -\omega & 0 \end{bmatrix}\begin{bmatrix} \hat{\lambda}^{e'}_{load,q} \\ \hat{\lambda}^{e'}_{load,d} \end{bmatrix} - \hat{L}_{l1}\frac{d}{dt}\begin{bmatrix} i^{e'}_{load,q} \\ i^{e'}_{load,d} \end{bmatrix}$$

wherein "^" represents the estimated values of the parameters of the transformer, and ω represents the angular frequency of the utility grid. Refer to FIG. 7A a block diagram schematically showing an embodiment of the open-loop flux linkage estimator 21. According to Equation (5), the open-loop flux linkage estimator 21 can obtain the load transformer flux linkage $\lambda_{load}$ via estimating the load current and the load voltage.

In the present invention, the load transformer flux linkage observer 20 may be a close-loop flux linkage observer 22 including an open-loop flux linkage estimator 21 and a flux linkage correction loop 23, wherein the close-loop control technology is used to improve the accuracy of the open-loop flux linkage estimator 21 and increase the stability of the load transformer flux linkage observer 20 when parameters vary. In the static reference frame, the mathematic model of the flux linkage correction loop 23 can be expressed by Equation (6):

$$\frac{d}{dt}\begin{bmatrix} i^{s'}_{load,q} \\ i^{s'}_{load,d} \end{bmatrix} = \frac{R'_2}{L'_2L_1 - L_m^2} \times \left(\begin{bmatrix} \lambda^{s'}_{load,q} \\ \lambda^{s'}_{load,d} \end{bmatrix} + \frac{L'_2}{R'_2}\begin{bmatrix} V^{s'}_{load,q} \\ V^{s'}_{load,d} \end{bmatrix} - \frac{L_m}{R'_2}\begin{bmatrix} V^{s'}_{load2,q} \\ V^{s'}_{load2,d} \end{bmatrix}\right) - \frac{R'_2L_m + L'_2R_1}{L'_2L_1 - L_m^2}\begin{bmatrix} i^{s'}_{load,q} \\ i^{s'}_{load,d} \end{bmatrix} \tag{6}$$

Combining Equations (3) and (4) can obtain Equation (6). Equation (6) is transformed to obtain Equation (7) via the SRF—the mathematical model to design the close-loop flux linkage observer 22, wherein "^" represents the estimated values of the parameters of the transformer.

$$\frac{d}{dt}\begin{bmatrix} i^{e'}_{load,q} \\ i^{e'}_{load,d} \end{bmatrix} = \frac{\hat{R}'_2}{\hat{L}'_2\hat{L}_1 - \hat{L}_m^2} \times \left(\begin{bmatrix} \lambda^{e'}_{load,q} \\ \lambda^{e'}_{load,d} \end{bmatrix} + \frac{\hat{L}'_2}{\hat{R}'_2}\begin{bmatrix} V^{e'}_{load,q} \\ V^{e'}_{load,d} \end{bmatrix} - \frac{\hat{L}_m}{\hat{R}'_2}\begin{bmatrix} V^{e'}_{load2,q} \\ V^{e'}_{load2,d} \end{bmatrix}\right) - \frac{\hat{R}'_2\hat{L}_m + \hat{L}'_2\hat{R}_1}{\hat{L}'_2\hat{L}_1 - \hat{L}_m^2}\begin{bmatrix} i^{e'}_{load,q} \\ i^{e'}_{load,d} \end{bmatrix} - \begin{bmatrix} 0 & \omega \\ -\omega & 0 \end{bmatrix}\begin{bmatrix} i^{e'}_{load,q} \\ i^{e'}_{load,d} \end{bmatrix} \tag{7}$$

Figure 7B:
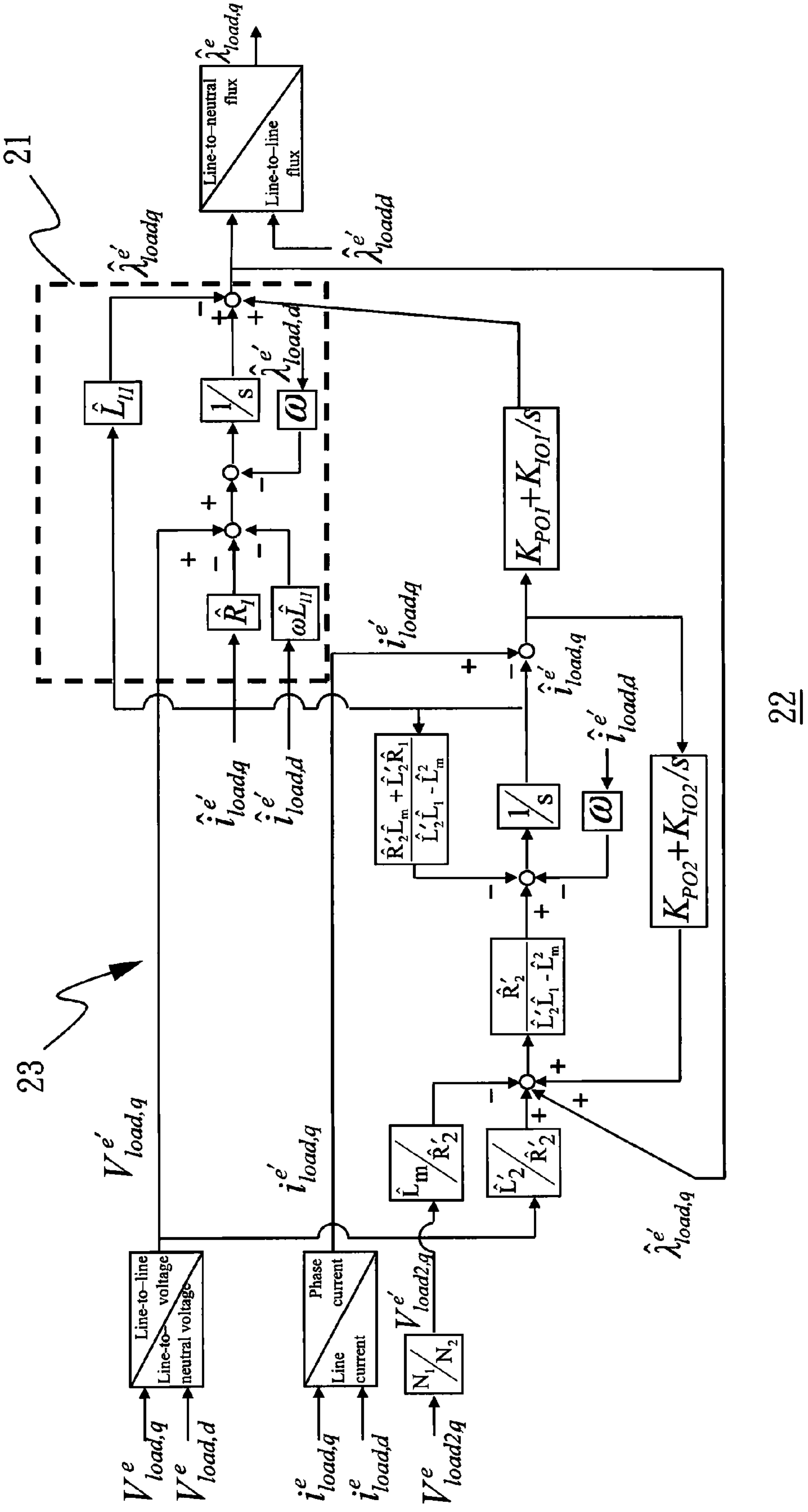
FIG. 7B is a block diagram schematically an embodiment of the close-loop flux linkage observer according to the present invention.

Combining Equations (5) and (7) can obtain the value of the load transformer flux linkage $\lambda_{load}$ output by the close-loop flux linkage observer 22. Refer to FIG. 7B a block diagram schematically showing an embodiment of the close-loop flux linkage observer 22, which is based on Equation (7) and includes an open-loop flux linkage estimator 21 and a flux linkage correction loop 23.

As the calculation and transformation of the above-mentioned equations is the conventional knowledge, it will not repeat herein.

The flux linkage compensator of the present invention can integrate with the existing UPS system to fast compensate for the load voltage and prevent from the inrush current when the utility power end fails or the voltage drops dramatically. The present invention enables the UPS system to output a voltage compensating for the flux linkage deviation, wherefore the present invention can immediately correct the load transformer flux linkage deviation caused by a power failure and inhibit the inrush current. Further, the flux linkage compensator of the present invention can achieve the objective of inhibiting the inrush current without using any additional electric sensing element or hardware circuit.

It should be mentioned particularly: the flux linkage compensator, the current controller or the voltage controller, mentioned in the specification, are not necessarily a device independent from the UPS system but may be the substructure of the UPS system, such as a part of the control circuit, an equivalent circuit or a component, of the UPS system.

The embodiments described above are only to exemplify the present invention but not to limit the scope of the present invention. Any equivalent modification or variation according to the spirit of the present invention is to be also included within the scope of the present invention.

What is claimed is:

1. A flux linkage compensator for an uninterruptible power supply system, comprising:

a load transformer flux linkage observer generating a load transformer flux linkage signal, a compensation voltage command generator, and a flux linkage command generator generating a flux linkage command signal, wherein a difference between said load transformer flux linkage signal and said flux linkage command signal forms a flux linkage deviation signal, and wherein said compensation voltage command generator generates a voltage compensation signal according to said flux linkage deviation signal to make said flux linkage deviation signal approach zero, and whereby said voltage compensation signal compensates for an output voltage of said uninterruptible power supply system to prevent from an inrush current.

2. The flux linkage compensator for an uninterruptible power supply system according to claim 1, wherein said load transformer flux linkage observer generates said load transformer flux linkage signal via directly integrating a load voltage.

3. The flux linkage compensator for an uninterruptible power supply system according to claim 1, wherein said load transformer flux linkage observer is an open-loop flux linkage estimator.

4. The flux linkage compensator for an uninterruptible power supply system according to claim 1, wherein said load transformer flux linkage observer is a close-loop flux linkage observer.

5. The flux linkage compensator for an uninterruptible power supply system according to claim 1, wherein said compensation voltage command generator includes a proportional integral regulator making said flux linkage deviation signal approach zero.

6. The flux linkage compensator for an uninterruptible power supply system according to claim 5, wherein said compensation voltage command generator includes a feedforward controller used to enhance dynamic response of said flux linkage compensator.

* * * * *